(12) United States Patent
Iwaji et al.

(10) Patent No.: US 7,064,514 B2
(45) Date of Patent: Jun. 20, 2006

(54) MOTOR DRIVE SYSTEM FOR AC MOTORS

(75) Inventors: Yoshitaka Iwaji, Hitachinaka (JP);
Tsunehiro Endo, Hitachiota (JP);
Kiyoshi Sakamoto, Hitachi (JP);
Tomofumi Okubo, Narashino (JP)

(73) Assignees: Hitachi, Ltd., Tokyo (JP), trustee, for the benefit of Hitachi Air Conditioning Systems Co., Ltd.; Hitachi Industrial Equipment Systems Co., Ltd., Tokyo (JP); Hitachi Home & Life Solutions, Inc., Tokyo (JP)

( * ) Notice: Subject to any disclaimer, the term of this patent is extended or adjusted under 35 U.S.C. 154(b) by 0 days.

(21) Appl. No.: 10/781,745

(22) Filed: Feb. 20, 2004

(65) Prior Publication Data
US 2004/0183498 A1    Sep. 23, 2004

(30) Foreign Application Priority Data
Mar. 19, 2003    (JP) .............................. 2003-074750

(51) Int. Cl.
*H02P 27/04*    (2006.01)
(52) U.S. Cl. ...................... 318/801; 318/800; 318/802; 318/809; 318/810
(58) Field of Classification Search ................ 318/685, 318/671, 599, 801, 800, 802, 807, 809, 810; 363/37, 132
See application file for complete search history.

(56) References Cited

U.S. PATENT DOCUMENTS 5,686,807 A * 11/1997 Kusano et al. ............... 318/808
6,556,458 B1 * 4/2003 Ohmura et al. ................ 363/37
6,556,464 B1 * 4/2003 Sakai et al. .................. 363/132

FOREIGN PATENT DOCUMENTS

| CN | 1224272 A | 7/1999 |
| JP | 2-197295 | 8/1990 |
| JP | 2001-251889 | 9/2001 |
| JP | 2002-272194 | 9/2002 |
| JP | 2002-369574 | 12/2002 |

* cited by examiner

*Primary Examiner*—Rita Leykin
(74) *Attorney, Agent, or Firm*—Antonelli, Terry, Stout and Kraus, LLP.

(57) ABSTRACT

A motor drive system without any portion for directly detecting the rotor position, rotation speed and motor phase currents, capable of realizing a high-performance variable speed drive even at high carrier frequencies. When detecting a current from a DC power supply of an inverter for driving a motor, applied voltages and frequencies to the motor are controlled based on sampled values by sampling a current flowing as intermittent pulses in the vicinity of each power conduction time period.

17 Claims, 15 Drawing Sheets

MOTOR DRIVE SYSTEM FOR AC MOTORS

BACKGROUND OF THE INVENTION

1. Field of the Invention

The present invention relates to a motor drive system and a control method for AC motors.

2. Description of the Related Art

As a control method without using a rotation speed sensor or a position sensor of an AC motor, a motor drive system has been well known which detects phase currents of a motor as disclosed in JP-A-2001-251889, for example.

As a method without using a current sensor, there has been proposed, for example in JP-A-2-197295, a current reproducing method which detects a DC current of the inverter to drive a motor and reproduces an AC current of the motor from an instantaneous DC-current value detected and also from the switching states of the inverter. In this method, gate pulses to drive the inverter are used, a motor current which instantaneously appears in the DC current of the inverter is sampled and held, and thus, a motor current is indirectly detected.

With the current reproducing method, however, which reproduces a motor current on the basis of the inverter's input DC current and a gate pulse signal, it is difficult to capture a motor current component when the gate pulse is extremely short. Above all else, the higher the average switching frequency (carrier frequency) is set, the shorter the gate pulse becomes, making it more difficult to reproduce a current. As an antidote for this, if measures are taken to set a lower carrier frequency of the inverter, this increases higher harmonics of the current, which causes lower efficiency and results in occurrence of electromagnetic noise. Moreover, it becomes necessary to perform current sampling a minimum of twice in a carrier period of the inverter, and provide a special circuit. And on top of that, it is an imperative requirement to provide two analog input terminals to realize a one-chip microcomputer, and it is also necessary to mount two sets of AD converters or provide a high-speed AD converter to read the current continuously.

Therefore, the object of the present invention is to provide a motor drive system and a control method for the drive system that realize a high-performance motor drive at high carrier frequencies in a simple control structure.

SUMMARY OF THE INVENTION

In a motor drive system for AC motors, to detect a current from a DC power supply of the inverter, the inverter current is sampled in the proximity of an intermediate time of each conduction time period, and on the basis of sampled values, an applied voltage to the motor or frequency is controlled.

Other objects, features and advantages of the invention will become apparent from the following description of the embodiments of the invention taken in conjunction with the accompanying drawings.

DESCRIPTION OF THE EMBODIMENTS

Referring to FIGS. 1 to 17, description will next be made of embodiments of a motor drive system for controlling an AC motor according to the present invention. In the following embodiments, description will be made using a permanent magnet type synchronous motor as an AC motor; however, those embodiments can be realized with other types of AC motors, such as induction motors and reluctance motors.

(Embodiment 1)

Figure 1:
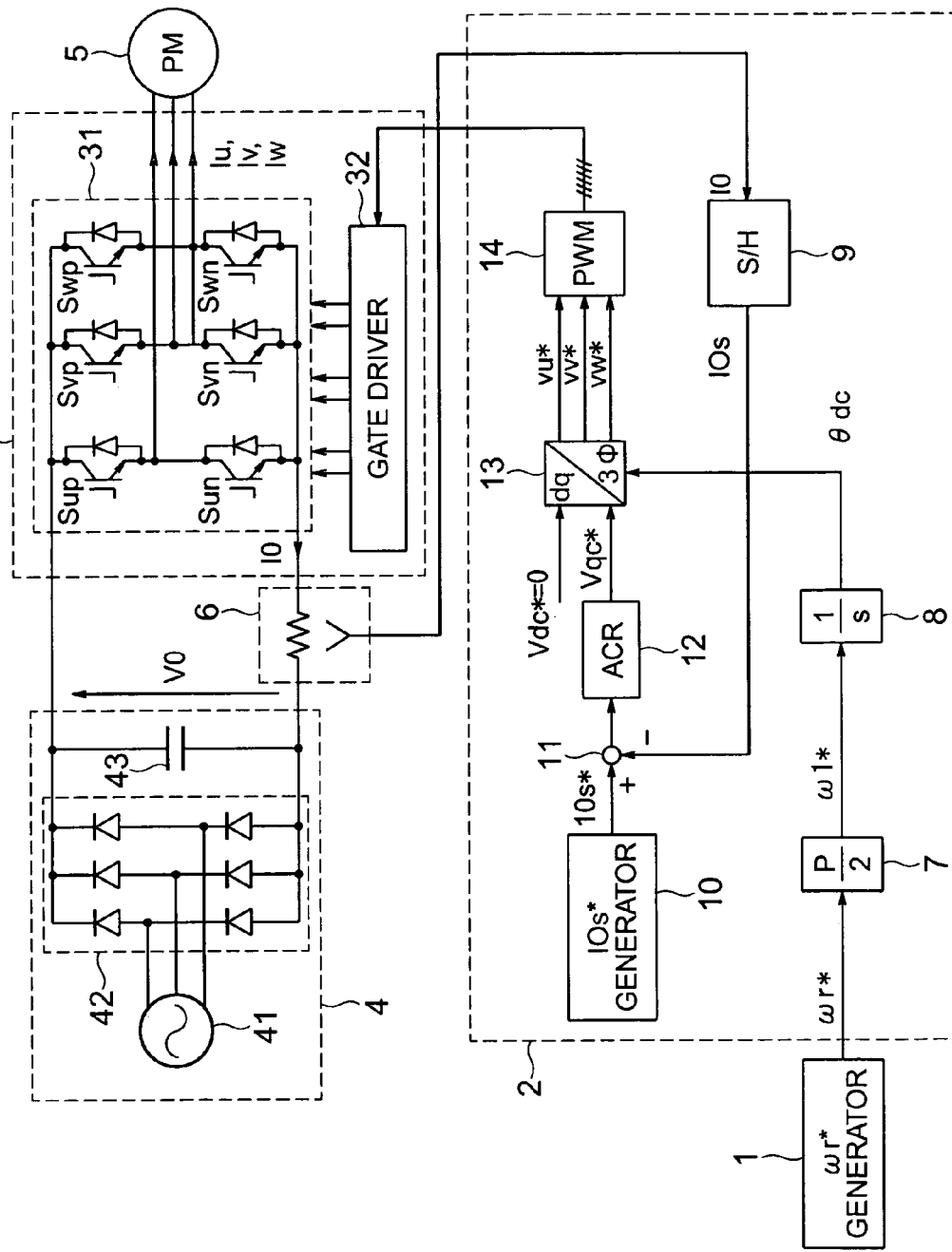
FIG. 1 is a block diagram showing a motor drive system according to an embodiment of the present invention.

FIG. 1 is a block diagram showing a system structure according to a first embodiment of an AC motor drive system of the present invention. A motor drive system of this embodiment comprises a rotation number command generator 1 for sending a rotation number command ωr* to a motor, a controller 2 for computing an AC voltage applied to the motor, converting it into a pulse-width-modulated signal (PWM signal), and outputting this PWM signal, an inverter 3 driven by this PWM signal, a DC power supply 4 for supplying electric power to the inverter 3, a permanent magnet type motor 5 as a controlling object, and a current detector 6 for detecting a current Ic supplied to the inverter 3.

The controller 2 comprises a conversion gain 7 for converting a rotation number command ωr* into an electrical angular frequency command ω1* of the motor 5 by using a pole number P of the motor, an integrator 8 for computing an AC phase θdc in the motor drive system, a current sampler 9 for sampling detected values of the current Io, an Ios* generator 10 for sending a command to a sampled current value Ios, an adder 11 for adding signals, a current controller 12 for computing an applied voltage command to the motor 5 so that the sampled current Ios coincides with Ios*, a dq inverter 13 for computing an AC voltage to the motor 5 based on the applied voltage command, and a PWM generator 14 for generating a gate pulse to drive the inverter 3 based on the AC voltage command.

The inverter 3 comprises a main circuit part 31, and a gate driver 32 for generating a gate signal to the main circuit. The DC power supply 4 to supply power to the inverter 3 comprises an AC power supply 41, a diode bridge 42 for rectifying AC power, and a smoothing capacitor 43 for suppressing a pulsating component contained in the DC power.

Referring to FIG. 1, description will be made of the operation principle of the first embodiment. The conversion gain 7 computes and outputs an electrical angular frequency ω1* of the motor 5 on the basis of a rotation number command ωr* from the rotation number command generator 1. The integrator 8 integrates ω1* to obtain an AC phase θdc. The current sampler 9 samples and holds a DC current Io of the inverter 3, and receives its value as Ios. This Ios is controlled by a current controller 12 so that Iso coincides with the current command Ios* output from an Ios* generator 10. The dq reverse converter 13 computes AC voltage commands vu*~vw* on the basis of applied voltage commands Vqc*, and Vdc* output from the current controller 12. Note that in this embodiment, Vdc* is set at 0. The arithmetic expression of the dq reverse converter 13 is as shown below.

$$\begin{bmatrix} vu* \\ vv* \\ vw* \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta_{dc} & -\sin\theta_{dc} \\ \sin\theta_{dc} & \cos\theta_{dc} \end{bmatrix} \begin{bmatrix} V_{dc}^* \\ V_{qc}^* \end{bmatrix} \quad (1)$$

Then, a PWM generator 14 converts an AC voltage command into a PWM signal. A gate driver 32 drives switching elements in response to this PWM signal, and applies AC voltages corresponding to Vdc* and Vqc* to the motor 5.

Figure 2:
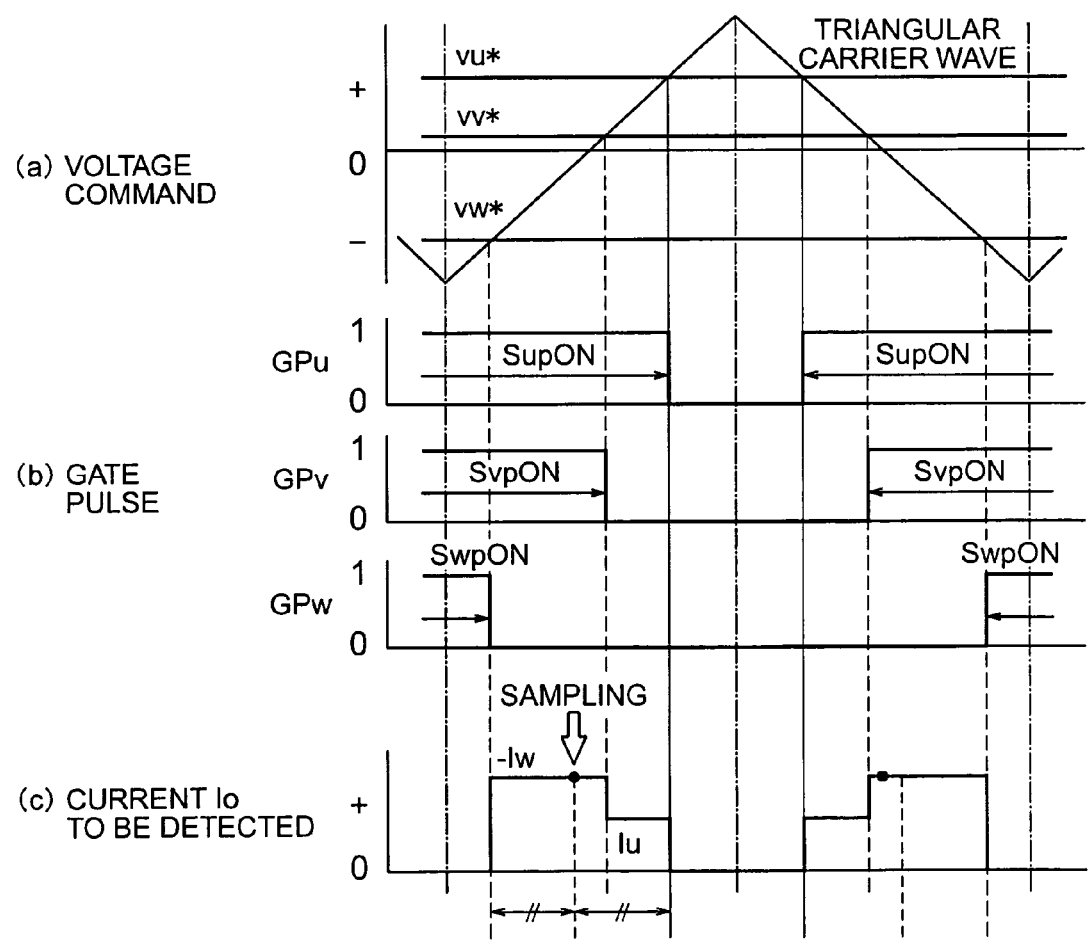
FIG. 2 is a diagram of a waveform example showing the relation between a principle of PWM modulation and current sampling according to the embodiment of the present invention.
Figure 3:
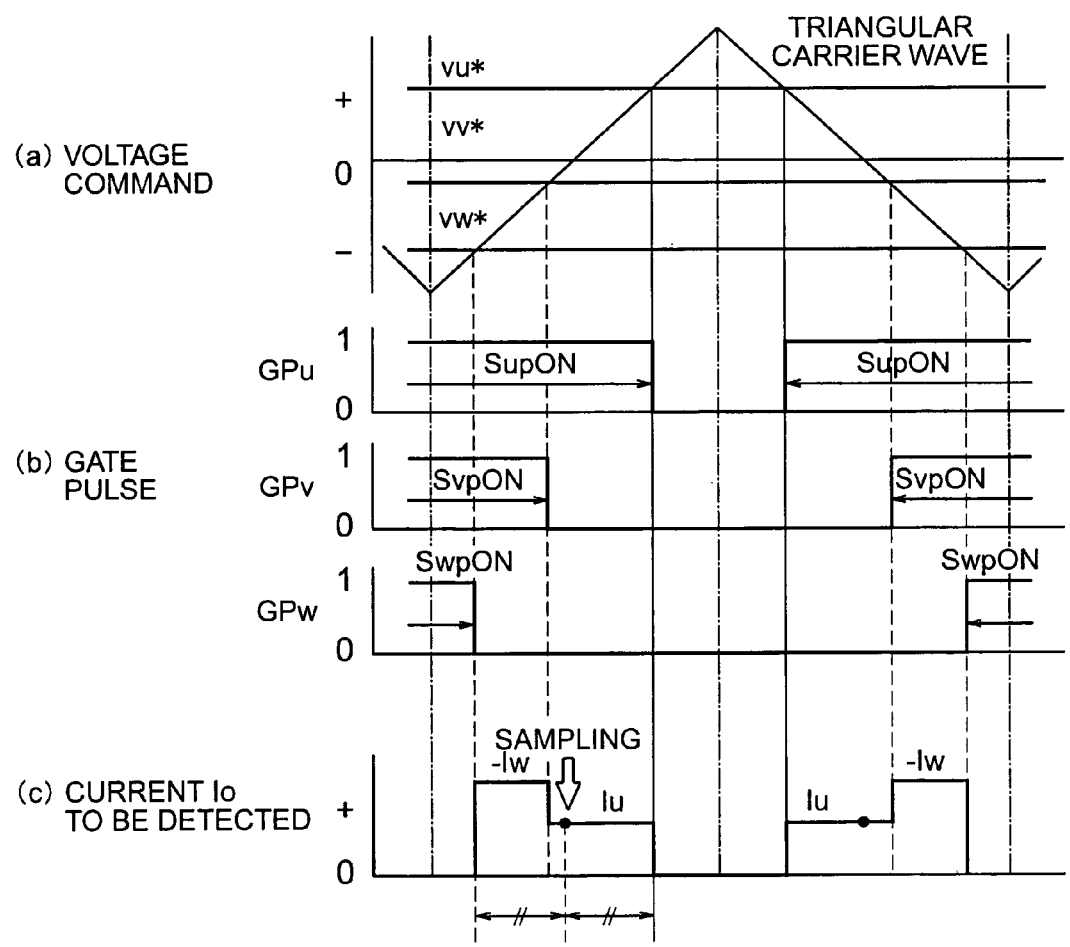
FIG. 3 is a diagram of a waveform example showing the relation between a principle of PWM modulation and current sampling according to the embodiment of the present invention.

FIGS. 2 and 3 show waveforms by which to indicate how the PWM generator 14 generates gate pulses from AC voltage commands. As illustrated, the gate pulses are generated by comparison between a triangular carrier wave of carrier signal and the magnitude of an AC voltage command. As shown in FIG. 2(a), the AC voltage command is in a condition of vu*>vv*>vw* and also in a condition of |vw*|>|vu*|>|vv*|. At this time, gate pulses GPu~GPw are as shown in FIG. 2(b). In FIG. 2(b), when GPu~GPw each have the value 1, the upper elements (Sup, Svp, Swp) of the main circuit 31 of the inverter turn on, and when GPu~GPw have the value 0, the lower elements (Sun, Svn, Swn) turn on. Under the condition of FIG. 2, the DC current Io of the inverter, which appears at the current detector 6, has a waveform as shown in FIG. 2(c). More specifically, the Io has a waveform in an intermittent pulse and each pulse has two phase currents appearing instantaneously. In FIG. 2, w-phase and u-phase currents can be observed. Those two phase currents that can be observed are a voltage-maximum phase current and a voltage-minimum phase current. In addition, out of those two phase currents, the phase current with a larger absolute value of the voltage command has a long conduction time period. In this case, the voltage-maximum phase is a u phase, and the voltage-minimum phase is a w phase, and the phase with a larger absolute value is the w phase.

To be more specific, if the inverter current is sampled in a conduction time period of the intermittent current Io and furthermore in the vicinity of an intermediate point of the conduction period, it follows that it is possible to detect a current of a phase of the largest absolute value of a voltage command. In this embodiment of three phases, if current sampling is performed in the range of 33~67% of the conduction time period from a rise-up time of the inverter current, the same effect can be obtained as in sampling in the vicinity of the intermediate point.

FIG. 3 shows a voltage command in a different condition from that of FIG. 2, in other words, FIG. 3 shows a voltage command in a condition of vu*>vv*>vw* and in a condition of |vu*|>|vw*|>|vv*|. In this case, when the inverter current is sampled in the vicinity of an intermediate point of the conduction time period of Io, a current value of u phase can be detected.

An AC voltage command is defined as shown below.

$$\begin{bmatrix} vu* \\ vv* \\ vw* \end{bmatrix} = \begin{bmatrix} V_o \sin\theta_v \\ V_o \sin\left(\theta_v - \frac{2\pi}{3}\right) \\ V_o \sin\left(\theta_v + \frac{2\pi}{3}\right) \end{bmatrix} \quad (2)$$

In this case, a voltage command waveform is as shown in FIG. 4(a). If the inverter current is sampled in the vicinity of an intermediate point of a conduction time period of Io, a detectable phase current switches from one phase current to another at 60-degree intervals according to the phase of voltage θv as shown in FIG. 4(b). The post-sampling current waveform Ios is as represented by a heavy line in FIG. 4(c).

In an AC motor, because it has an inductance component, the current lags the voltage as indicated by the voltage phases in FIG. 4(a) and the current phases in FIG. 4(c). The voltage phase changes according to a motor constant and load conditions, but the waveform of Ios can be observed tracing about its maximum level.

In this embodiment, Ios is controlled so as to coincide with a current command Ios*, with the result that a predetermined amount of AC current flows in the motor 5. Since a sufficient amount of current flows, it is possible to secure a torque for start-up of the motor.

In the conventional "current reproducing method", when a motor is started, the higher the frequency of a triangular carrier, the narrower the gate pulse width becomes; therefore, it becomes difficult to detect a current. When starting the motor, owing to the effect of dead time (short-circuit protection time for the upper and lower switching elements of the inverter) or the effect from switch-on voltage drop, it is difficult to conduct a predetermined amount of current without feedback. In contrast, in this embodiment, by sampling a current in the vicinity of the intermediate point of the conduction pulse width and controlling the sampled values, it is possible to securely conducting sufficient current for start-up. Timing for sampling a current is set simply and a complicated current detection algorithm is not required. To realize this embodiment by using a microcomputer, it is only necessary to connect output of the current detector 6 to one analog input terminal, and only one AD converter, not shown, need to be provided.

Next, description will be made of a method for generating timing to sample and hold a current Io.

Sampling a current in the vicinity of an intermediate point of a conduction time period can be realized by, for example, measuring a pulse width by using a rise and a fall of the current Io as a trigger, estimating an intermediate point of a pulse from the rise of the next pulse, and generating a sampling signal. This method, however, requires complicated hardware and there is a worry that malfunctioning may occur due to effects of noise.

Figure 5:
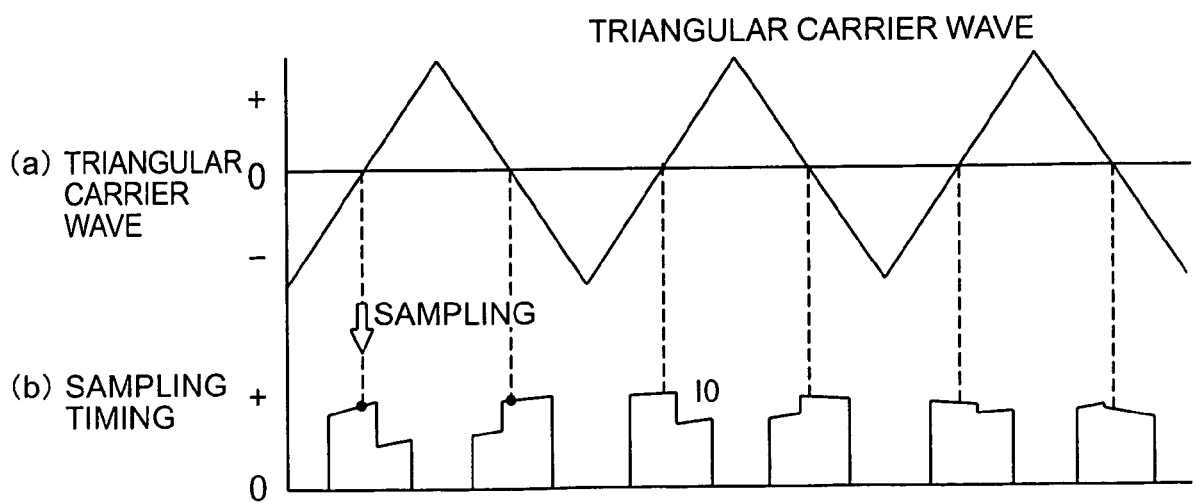
FIG. 5 is a waveform diagram showing timing of current sampling according to the embodiment of the present invention.

Referring to FIG. 5, description will be made of a method for generating a sampling signal. In the case of generating PWM pulses as shown in FIGS. 2 and 3, the intermediate time of a conduction time period coincides with the intermediate point between an upper peak and a lower peak of the triangular carrier. In other words, by generating a sampling signal of Io at a zero cross point of the triangular carrier, Ios can be obtained easily.

Figure 6:
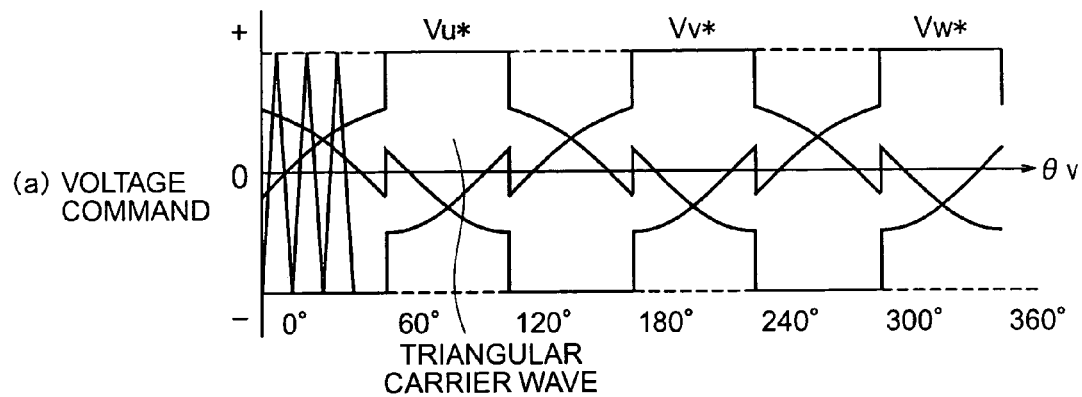
FIG. 6 is a waveform diagram showing a relation between voltage commands and a triangular carrier wave in 2-phase modulation in prior art.

In some kind of PWM modulation, voltage commands of a waveform as depicted in FIG. 6 are used. This kind of PWM modulation is called "2-phase switching method", in which one of the 3 phases is not used for switching at any one time. For example, in FIG. 6, in a period of $6° < \theta v < 120°$, the u-phase switching element on the upper side (Sup in FIG. 1) stays on and the u-phase switching element on the lower side (Sun in FIG. 1) stays off. The voltage commands mentioned above can be realized by adding a common voltage component (zero-phase component) to all voltage commands in original sine-wave form at three phases.

Figure 7:
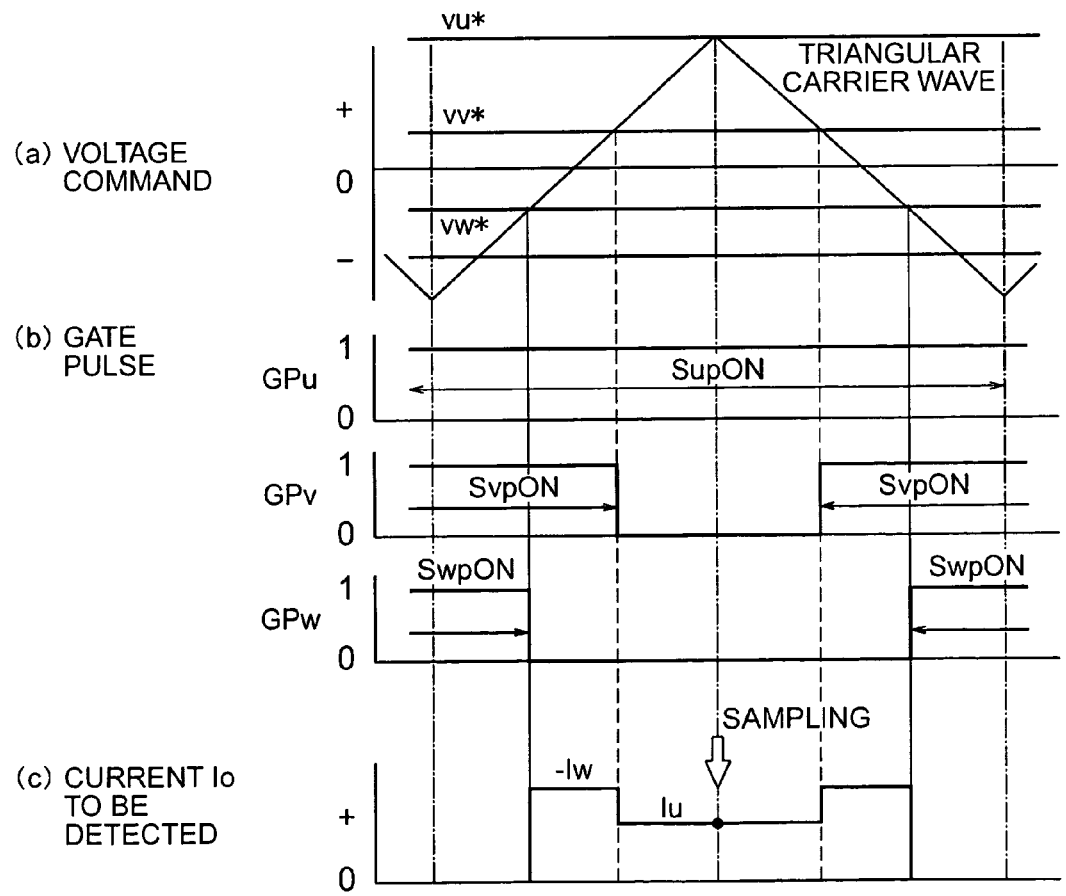
FIG. 7 is a waveform diagram showing timing of current sampling when 2-phase modulation is used in the embodiment of the present invention.

FIG. 7 shows voltage commands, gate pulses, and Io under the above-mentioned conditions.

As is obvious from FIG. 7, when the u-phase voltage is larger than an upper peak of the triangular carrier, the time of the upper peak of the triangular carrier coincides with the intermediate time of a conduction time period. Therefore, at this timing, the inverter current can be sampled. If a voltage command of one phase is to be made to saturate on the negative side in a period of 0° to 60° as shown in FIG. 7, for example, the current need only be sampled at the time of a lower peak of the triangular carrier.

(Embodiment 2)

Figure 8:
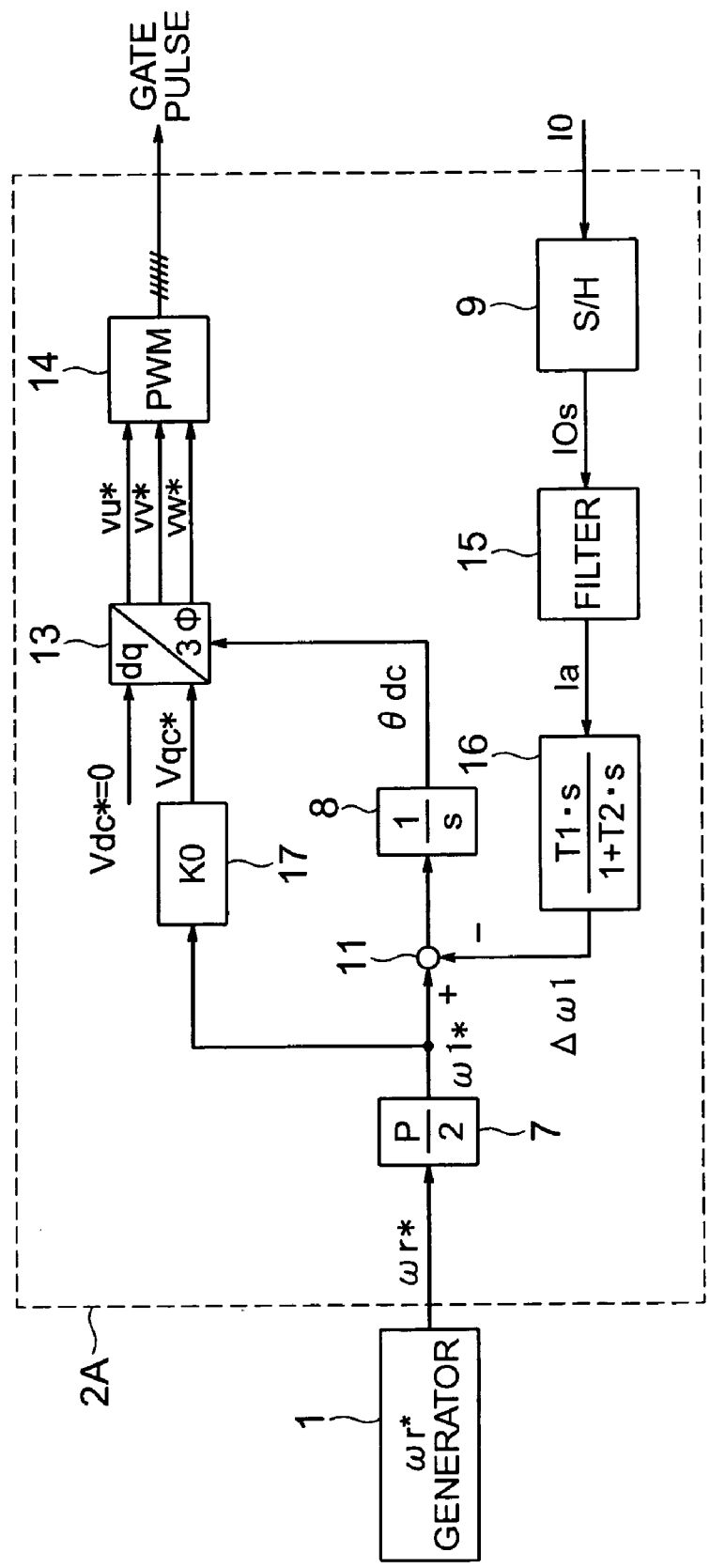
FIG. 8 is a block diagram showing a motor drive system according to one other embodiment of the present invention.

Referring to FIG. 8, description will be made of a second embodiment of the present invention.

In the first embodiment, a current is provided in such a manner that the current flowing in the motor becomes a predetermined current value. In contrast, the second embodiment has as its object to detect a "reactive current" that flows in the motor to thereby control the motor with high performance.

FIG. 8 shows a block diagram of a controller 2A. Instead of the controller 2 in FIG. 1, the controller 2A in FIG. 8 is used which enables the second embodiment to be realized. In FIG. 8, the blocks which differentiate the second embodiment from the first embodiment are a filters 15 for Ios, aω1 compensator 16 that adds Δω1 to an electrical angular frequency command ω1* of the motor on the basis of output of the filter 15, and a voltage command computing unit 17 that decides a voltage applied to the motor from ω1*.

The controller 2A does not control the current, but computes voltage command Vqc* directly from ω1* by using a voltage command computing unit 17. In this way, as a method for controlling the motor is by V/F constant control as the basis, but there is no problem if current control is used as in the controller in FIG. 1.

Description will now be moved on to the filter 15 and the ω1* compensator 16, which is peculiar to the second embodiment. In the controller 2A in FIG. 8, the filter 15 is provided for Ios, and output from the filter is used as an active current Ia. The principle for obtaining the active current Ia by passing Ios through the filter 15 is explained in the following.

The applied voltage V and the current of the motor are defined by Eq. (3) as follows.

$$V = V_o \sin \theta_v$$

$$I = I_o \sin(\theta_v + \delta) \quad (3)$$

In Eq. (3), Vo is the current amplitude and coincides with Vqc* in this second embociment, Io is the current amplitude, θv is the voltage phase, δ is the current phase (power factor angle). I in Eq. (3) can be expressed by Eq. (4).

$$I = Io \cos \delta \sin \theta v + Io \sin \delta \cos \theta v \quad (4)$$

From Eq. (4), the magnitude of the active current Ia and the reactive current Ir are expressed by Eq. (5).

$$Ia = Io \cos \delta$$

$$Ir = Io \sin \delta \quad (5)$$

Since Eq. (4) concerns the u-phase current, which is observed as Ios in a period of $60° < v < 120°$. Supposing that the current in this period is averaged, an average value Im in this period in Eq. (4) is obtained as follows. Because the average value is in the period of 60°~120°, $$I_m = \frac{1}{\frac{\pi}{3}} \int_{\frac{\pi}{3}}^{\frac{2\pi}{3}} I d\theta_v = \frac{3}{\pi} \int_{\frac{\pi}{3}}^{\frac{2\pi}{3}} (I_o \cos\delta\sin\theta_v + I_o \sin\delta\cos\theta_v) d\theta_v \quad (6)$$

$$= \frac{3I_o}{\pi} \cos\delta$$

That is, an active current component Ia can be computed by using the average value Im as follows.

$$Ia = Io\cos\delta = \frac{\pi}{3} Im \quad (7)$$

Therefore, by averaging Ios by passing through the filter 15, an active current Ia can be obtained.

Because the active current Ia directly represents the magnitude of load on the motor, by making effective use of the active current for control, a more stable motor drive system can be realized. The controller 2A shown in FIG. 8 computes Δω1 which is a compensation amount to ω1* based on Ia. The ω1 compensator 16 carries out incomplete differentiation of Ia, reduces the electrical angular frequency when the load is increased and the active current increases, or raises the electrical angular frequency when the load is decreased and the active current decreases. By this arrangement, it becomes possible to greatly reduces the transient vibration due to load fluctuation, thus making it possible to realize a more stable motor drive system for AC motors.

Figure 9:
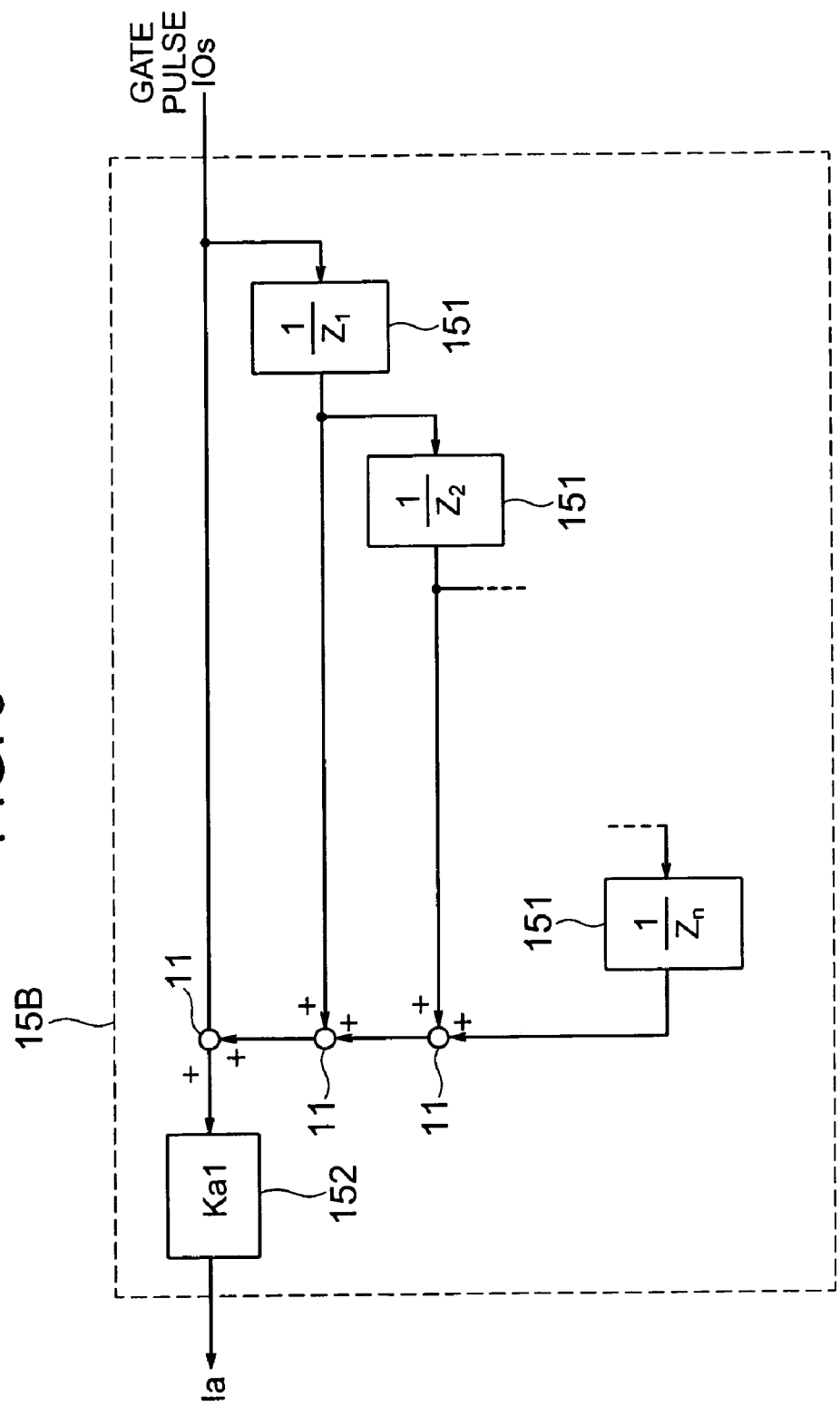
FIG. 9 is a block diagram showing a moving average filter according to the one other embodiment of the present invention.

It ought to be noted that the filter 15 needs to remove harmonic components six times as high as a frequency by which to drive the motor. In this case, the pulsating components can be removed easily by using a moving average filter rather than by using a first-order time-lag filter. FIG. 9 is a block diagram when a moving average filter 15B is used for the filter 15. In FIG. 9, the moving average filter 15B comprises a signal delay unit 151 as a delay element for a single arithmetic operation, an adder 11, and a filter gain 152. This period for taking a moving average only need be set to correspond to an electrical angle of 60°. As a result, the pulsating components included in Ios can be removed ideally and the active current Ia can be detected accurately.

(Embodiment 3)

Figure 10:
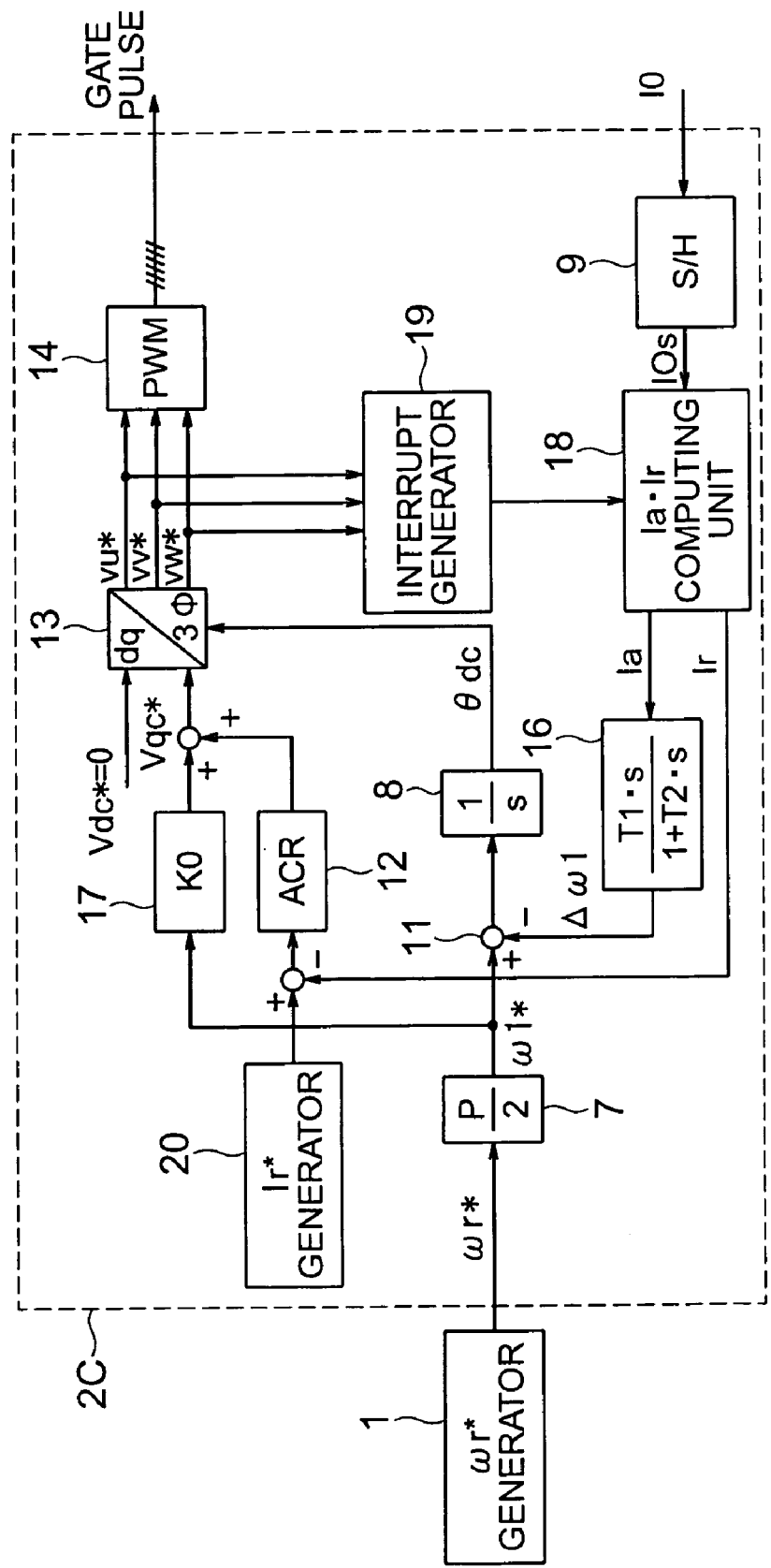
FIG. 10 is a block diagram showing a motor drive system according to yet another embodiment of the present invention.
Figure 11:
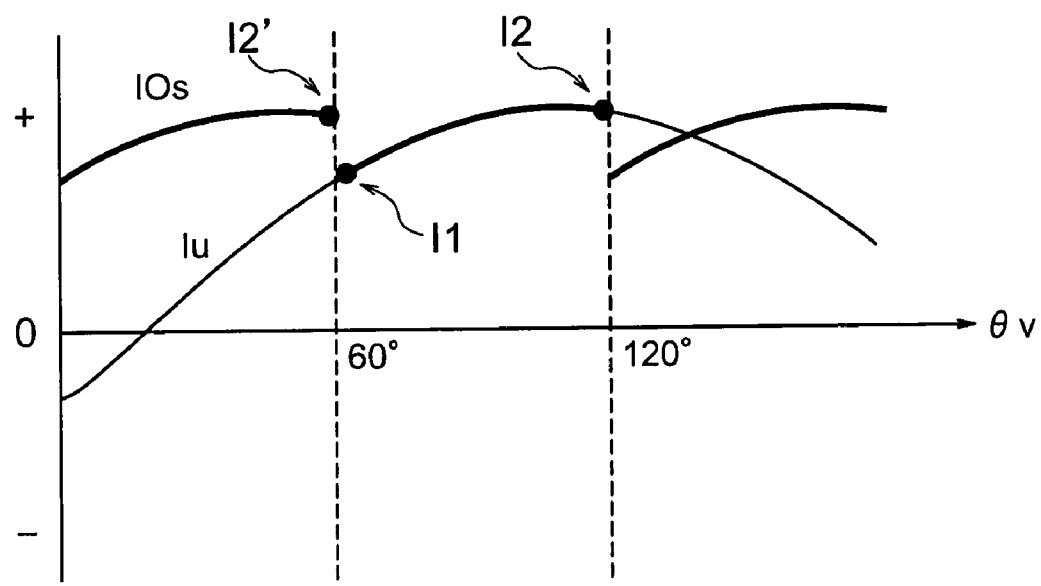
FIG. 11 is a waveform diagram for explaining the operation of the motor drive system according to the yet other embodiment of the present invention.

Referring to FIGS. 10 and 11, a third embodiment of the present invention will be described. FIGS. 10 and 11 show a method for detecting a reactive current and an example in which this method was applied to control.

FIG. 10 is a block diagram of a controller 2C. Instead of the controller 2 in FIG. 1, by using the controller 2C in FIG. 10, the third embodiment can be realized. In FIG. 10, the parts that differentiate the controller 2C from the controllers 2 and 2A in the above-mentioned embodiments are: an Ia·Ir computing unit 18 for computing at least one of the active current Ia and the reactive current Ir, which flow in the motor, from Ios; an interrupt generator 19 for generating an interrupt to start computing in the Ia·Ir* computing unit 18; and an Ir* generator 20 for giving a current command Ir* to the reactive current Ir.

Then, description will be made of the operation principle of the third embodiment. The Ia·Ir computing unit 18 computes an active current and a reactive current flowing in the motor. The interrupt generator 19 generates an interrupt signal at every 60°, that is, at θv=0°, 60°, 120°, 180°, 240°, and 300° as a trigger to the Ia·Ir computing unit.

Figure 4:
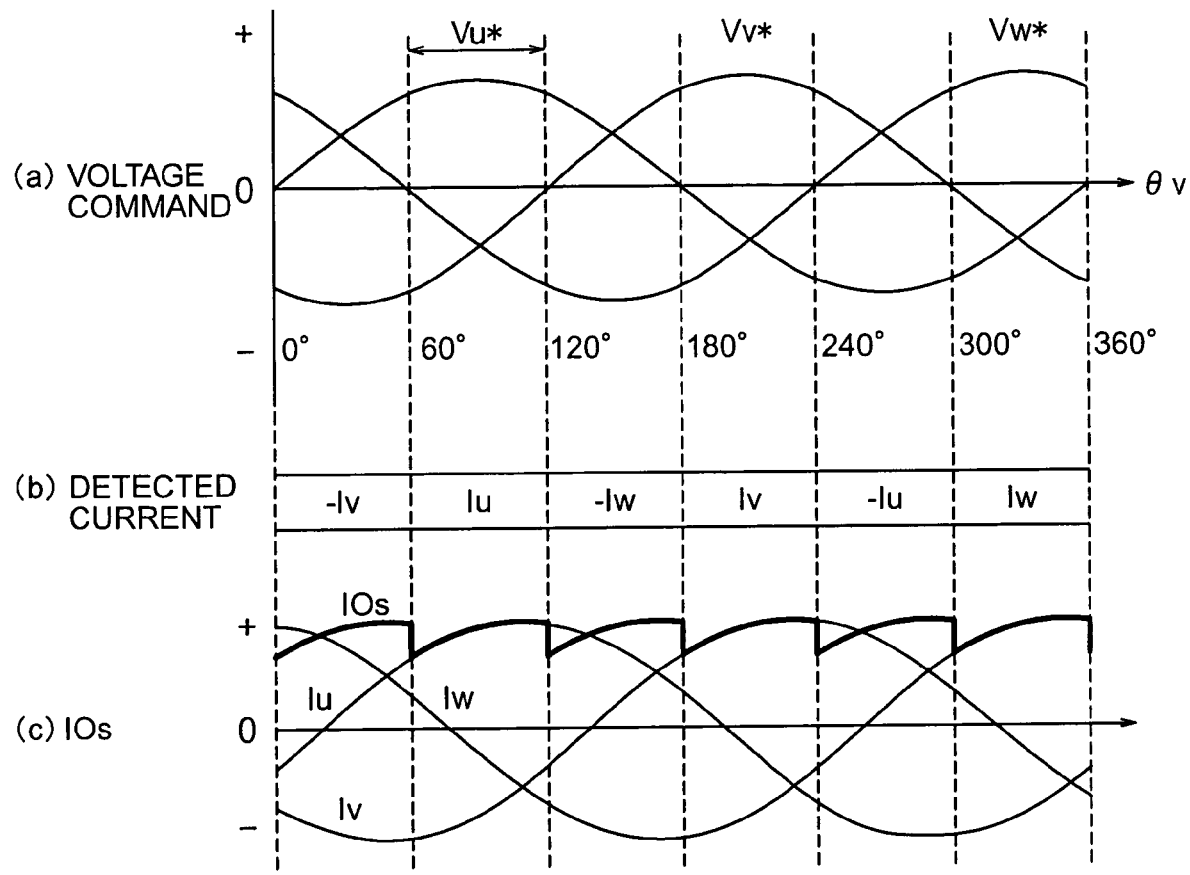
FIG. 4 is a waveform diagram showing relations among voltage commands, phase currents, and current sampled values according to the embodiment of the present invention.

Each time the current is sampled as shown in FIG. 4, the phase of detected current Ios changes at every 60° of θv. As shown in FIG. 11, the current value just after the current phase that can be observed changed is defined as I1 and the current value just before that change is defined as I2. Suppose that the θv is in a period of 60°~120°. Because the u-phase current can be observed in this period, I1 and I2 can be expressed by using Eq. (4).

$$I_1 = I(\pi/3) = I_o\cos\delta\sin\frac{\pi}{3} + I_o\sin\delta\cos\frac{\pi}{3} \quad (8)$$

$$= I_o\cos\delta\frac{\sqrt{3}}{2} + I_o\sin\delta\frac{1}{2}$$

$$I_2 = I(2\pi/3) = I_o\cos\delta\sin\frac{2\pi}{3} + I_o\sin\delta\cos\frac{2\pi}{3}$$

$$= I_o\cos\delta\frac{\sqrt{3}}{2} - I_o\sin\delta\frac{1}{2}$$

From Eq. (8), $$I_1 + I_2 = \sqrt{3}I_o\cos\delta \quad (9)$$

$$I_1 - I_2 = I_o\sin\delta \quad (10)$$

From Eq. (5), Ia and Ir become as follows.

$$I_a = I_o\cos\delta = \frac{I_1 + I_2}{\sqrt{3}} \quad (11)$$

$$Ir = Io \sin \delta = I_1 - I_2 \quad (12)$$

Therefore, by using sampled current values before and after the detectable current phase changes, the active current and the reactive current of the motor can be detected. In a steady state, I2'=I2 as shown in FIG. 11, and therefore Ia and Ir can be computed by using I1 and I2'. According to this method, the active current and the reactive current can be computed without computing delay.

Because the active current and the reactive current can be detected as described above, it follows that phase information about motor current can be obtained, so that motor control of higher level can be realized. In FIG. 10, a current command Ir* is given to a reactive current Ir to control the reactive current to coincide with a predetermined value. By controlling the reactive current, it becomes possible to achieve efficiency optimized motor operation or realize field weakening control, thus making it possible to provide a high-performance a motor drive system for AC motors.

(Embodiment 4)

Figure 12:
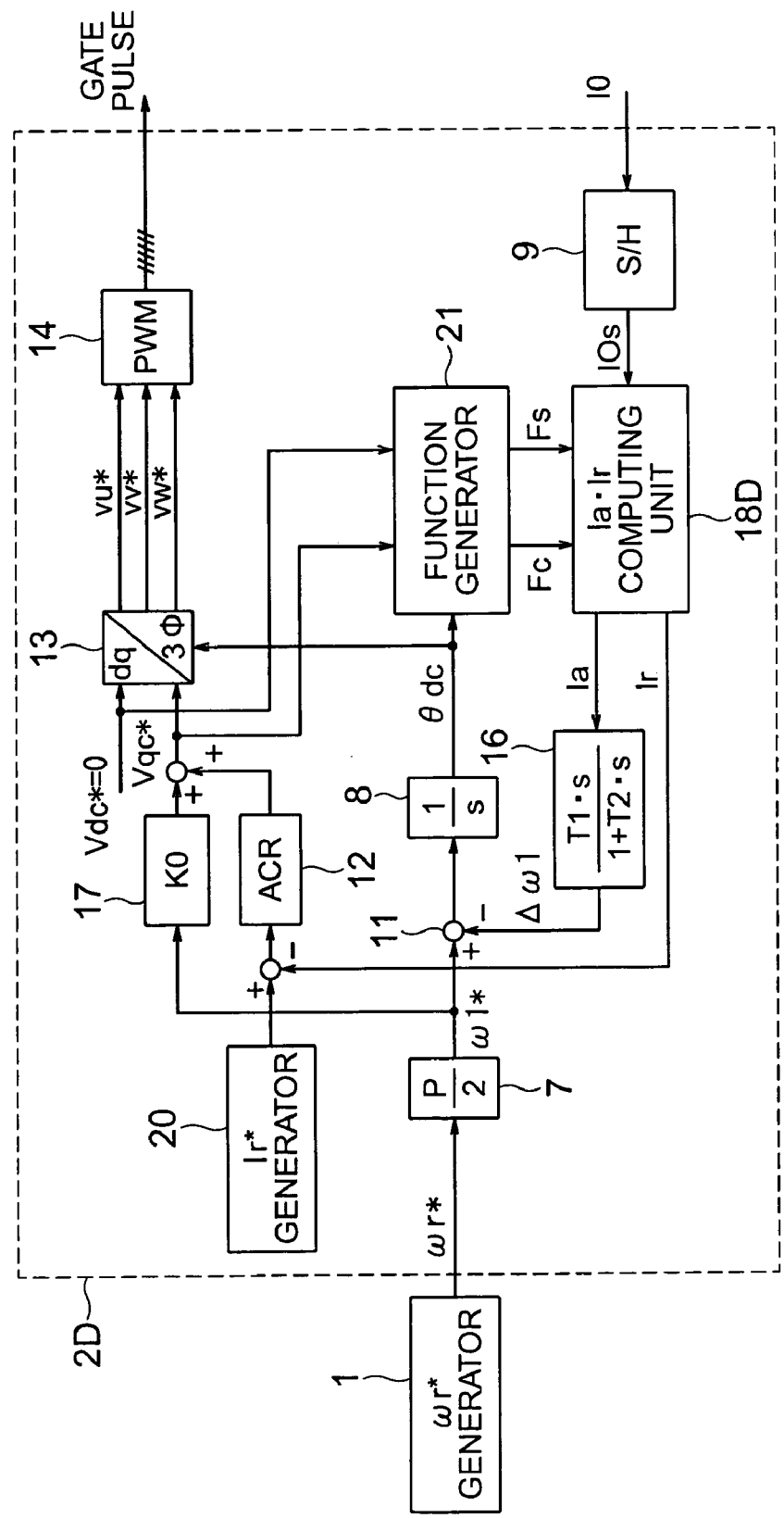
FIG. 12 is block diagram showing a motor drive system according to a still other embodiment of the present invention.
Figure 13:
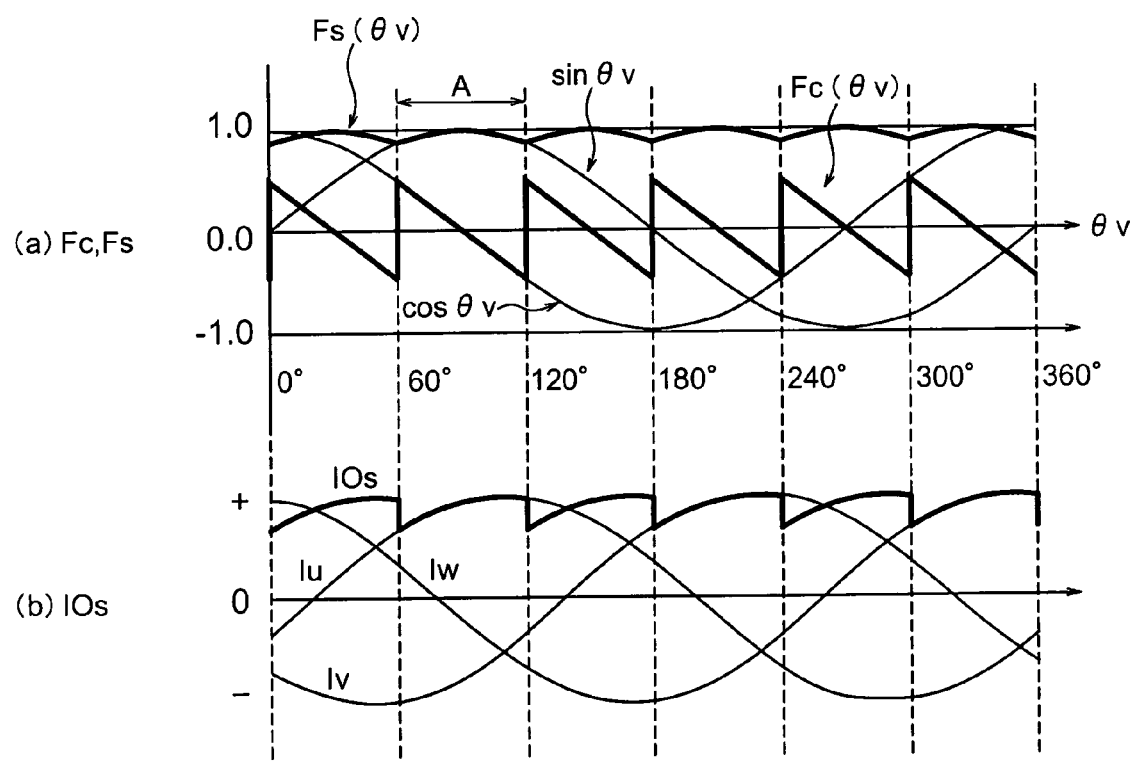
FIG. 13 is a waveform diagram for explaining the operation of the motor drive system according to the still other embodiment of the present invention.

Referring to FIGS. 12 and 13, description will be made of a fourth embodiment of the present invention.

In the third embodiment related to a method for detecting an active current and a reactive current that flow in a motor, timing that allows those currents to be computed is only once in every 60°. Therefore, there are chances for detected values to be affected by noise.

The fourth embodiment provides a method for computing active and reactive currents by integrating sampled current values Ios to reduce chances of effects from noise.

FIG. 12 is a block diagram of a controller 2D. In FIG. 12, the parts which differentiate the controller 2D from the controllers 2, 2A and 2C in the above-mentioned embodiments are: an Ia·Ir computing unit 18D for computing an active current component Ia and a reactive current component Ir, which flow in a motor, from Ios; a function generator 21 for generating a frequency functions Fc and a Fs used in the Ia·Ir computing unit 18D; and an Ir* generator 20 for giving a command current Ir* to a reactive current Ir.

Description will now be made of the operation principle of the fourth embodiment. The controller 2D of FIG. 12 is basically equivalent in operation to the one shown in FIG. 10, but greatly differs in the method for obtaining Ia and Ir.

The function generator 21 generates waveforms (Fc(θv), Fs(θv)) as shown in FIG. 13. The function Fs is a function to repeatedly outputs a waveform in a period of 60°~120° of sin θv, and the function Fc is a function to repeat a waveform in a period of 60°~120° of cos θv.

The Ia·Ir computing unit 18D carries out an integrating operation shown below.

$$I_{am} = \frac{2}{\frac{\pi}{3}} \int_{\theta_{vO}}^{\theta_{vO}+\frac{\pi}{3}} I_{Os} \times F_s \, d\theta_v \quad (13)$$

$$I_{rm} = \frac{2}{\frac{\pi}{3}} \int_{\theta_{vO}}^{\theta_{vO}+\frac{\pi}{3}} I_{Os} \times F_c \, d\theta_v \quad (14)$$

The θvo in Eqs. (13) and (14) is an optional voltage command phase.

The operation principle will be described referring to a case where θv is 60°~120°. In this period, Fs=sin θv and Fc=cos θv, and Ios can be expressed by Eq. (4). By expanding Eq. (13), we obtain:

$$I_{am} = \frac{2}{\pi} \int_{\frac{\pi}{3}}^{\frac{2\pi}{3}} I \sin\theta_v \, d\theta_v \quad (15)$$

$$= \frac{6}{\pi} \int_{\frac{\pi}{3}}^{\frac{2\pi}{3}} (I_o \cos\delta \sin^2\theta_v + I_o \sin\delta \cos\theta_v \sin\theta_v) \, d\theta_v$$

$$= I_o \cos\delta \left( \frac{2\pi + 3\sqrt{3}}{2\pi} \right)$$

From Eq. (15), we obtain:

$$I_a = I_o \cos\delta = \frac{2\pi}{2\pi + 3\sqrt{3}} I_{am} \quad (16)$$

From Iam, an active current Ia can be computed. Similarly, by expanding Eq. (14), we obtain:

$$I_{rm} = \frac{2}{\pi} \int_{\frac{\pi}{3}}^{\frac{2\pi}{3}} I \cos\theta_v \, d\theta_v \quad (17)$$

$$= \frac{6}{\pi} \int_{\frac{\pi}{3}}^{\frac{2\pi}{3}} (I_o \cos\delta \sin\theta_v \cos\theta_v + I_o \sin\delta \cos^2\theta_v) \, d\theta_v$$

$$= I_o \sin\delta \left( \frac{2\pi - 3\sqrt{3}}{2\pi} \right)$$

Therefore, from Eq. (15), Ir can be obtained as follows.

$$I_r = I_o \sin\delta = \frac{2\pi}{2\pi - 3\sqrt{3}} I_{rm} \quad (18)$$

From Irm, a reactive current Ir can be computed.

In the fourth embodiment, by an integration operation, an active current Ia and a reactive current Ir can be computed. By an integration operation, the computing operation is less susceptible to external factors, such as noise, and therefore it is possible to realize a motor drive system of an AC motor with high accuracy and enhanced stability.

(Embodiment 5)

Description will be made of a fifth embodiment with reference to FIGS. 14 and 15.

In actual motor control, in many cases, "vector control" is employed which controls the motor current by dividing the motor current into a flux axis component of the motor (d-axis component) and a component (q-axis component) orthogonal to the d-axis component. The fifth embodiment realizes vector control.

Figure 14:
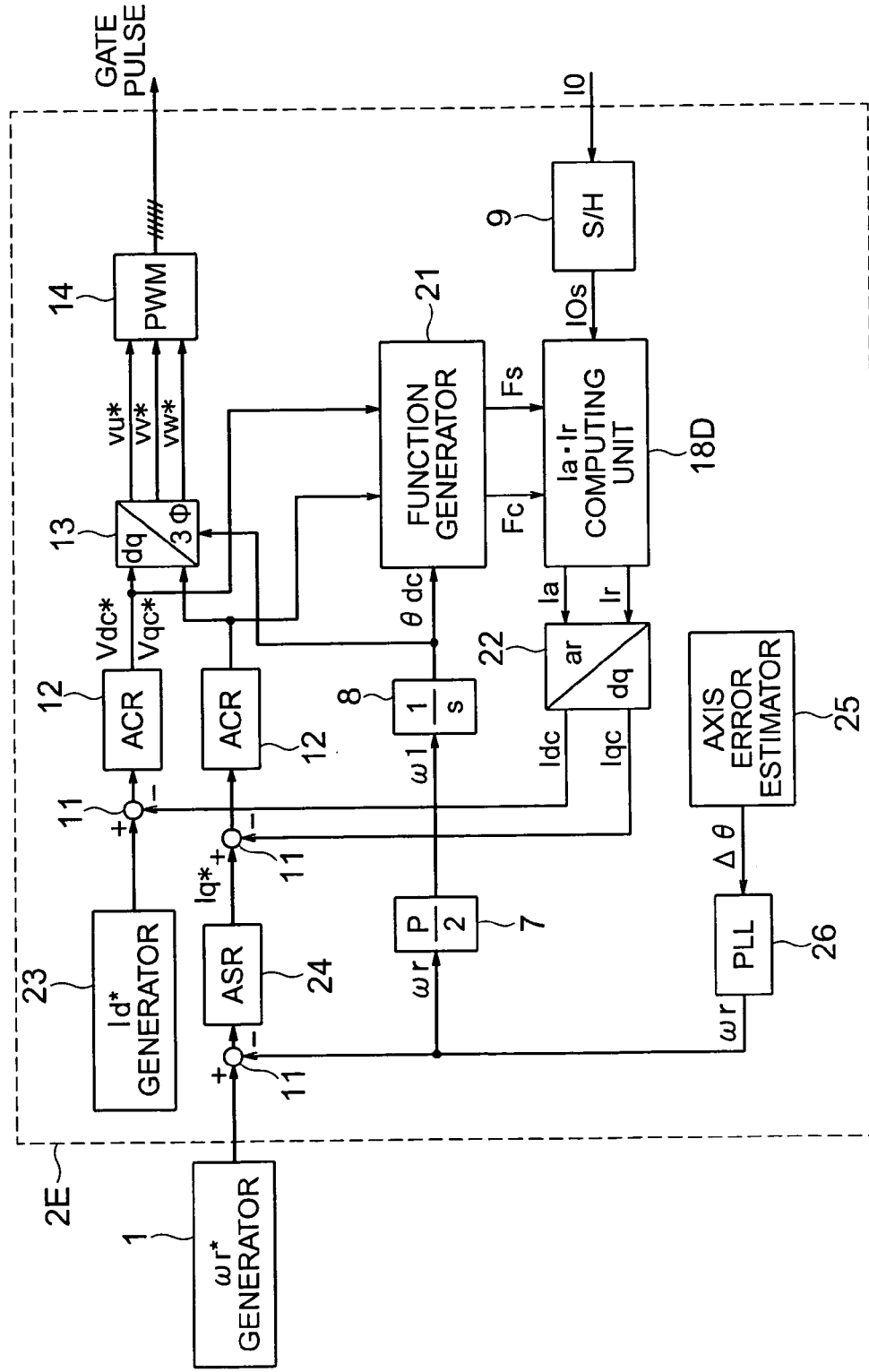
FIG. 14 is a block diagram showing a motor drive system according to a further embodiment of the present invention.

FIG. 14 is a block diagram of a controller 2E. In FIG. 14, the parts which differentiate the controller 2E from the controllers 2, 2A, 2C and 2D are: an ar-dq converter 22 for computing currents Idc (d-axis current) and Iqc (q-axis current) from an active current component Ia and a reactive current component Ir (the d-axis and q-axis are defined with respect to the flux axis of the motor); an Id* generator 23 for generating a current command Id* on the d-axis; a speed controller 24 for computing a difference between a rotation speed (rotation number) command ωr* and a speed estimate value ωr and outputting a current command Iq* on the q-axis; an axis error estimating unit 25 for computing an axis error Δθ between the d-axis position (phase) of the motor and the phase (θdc) for control; and a PLL controller 26 for correcting the rotation speed so that the axis error becomes zero. Further, a current controller 12 for controlling Idc and Iqc so that they coincide with Id* and Iq*.

Next, description will be made of the operation of the fifth embodiment.

Based on Ia and Ir obtained by the Ia·Ir computing unit 18D, Idc and Iqc are computed by the ar-dq converter 22. Here, following Eq. (19), Idc and Iqc are obtained.

$$I_{dc} = -I_a \sin\phi + I_r \cos\phi$$

$$I_{qc} = I_a \cos\phi + I_r \sin\phi \quad (19)$$

The ψ in Eq. (19) is a phase-difference angle between the voltage phase and the q-axis, and can be obtained as $$\varphi = \tan^{-1} \frac{-V_{dc}^*}{V_{qc}^*} \quad (20)$$

Figure 15:
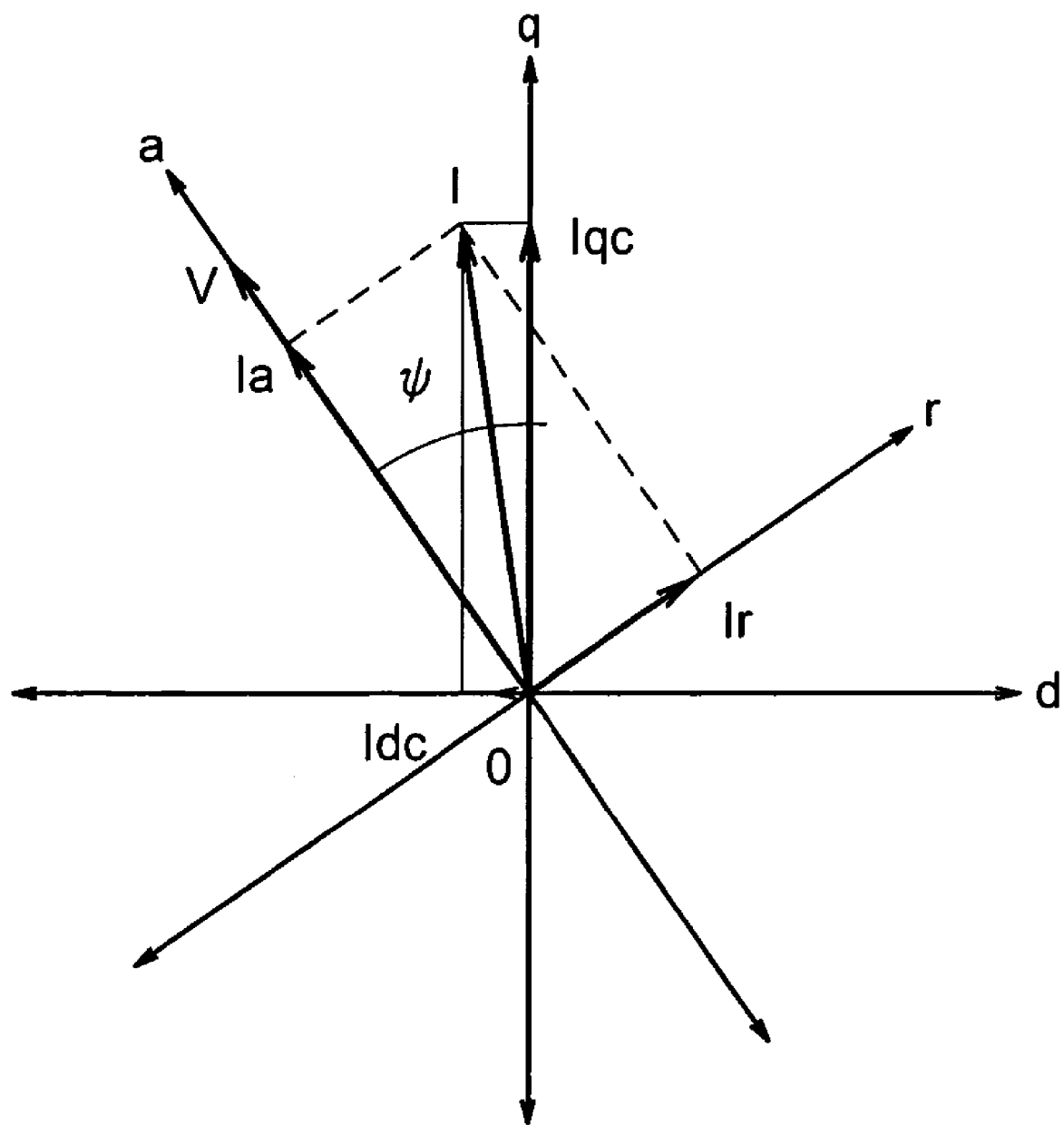
FIG. 15 is a vector diagram showing d-q coordinates and a relation between voltage and current.

The phase relation among the voltage and the currents of the motor is shown in FIG. 15.

The Idc and the Iqc are components corresponding to the exciting current and the torque current of the motor, and they are controlled by the current controller 12 so as to coincide with their command values Id* and Iq*.

The axis difference computing unit 25 estimates an error angle Δθ between the d-axis phase (θdc) assumed for control and the actual d-axis phase in the motor. The Δθ can be computed by using a voltage command and a detected current value. The PLL controller 26 outputs a motor speed ωr to reduce the axis error Δθ to zero. In steady state, the Δθ becomes zero and the d- and q-axes of the motor can be made to coincide with the axis for control without directly detecting the magnetic pole axes. The ωr is a rotation speed estimate value of the motor and a torque current command Iq* is computed by the speed controller 24 so that a deviation value of this rotation speed estimate value or from the rotation speed command ωr* becomes zero. The Iq* is compared with Iqc, and is controlled by the current controller 12 so that they coincide with each other. Also, the d-axis current Idc is controlled so as to become a predetermined value. With non-salient pole type magnetic motors, normally Id*=0.

As has been described, according to the sixth embodiment, the torque current and the exciting current of a motor can be controlled separately, thus making vector control possible.

(Embodiment 6)

Figure 16:
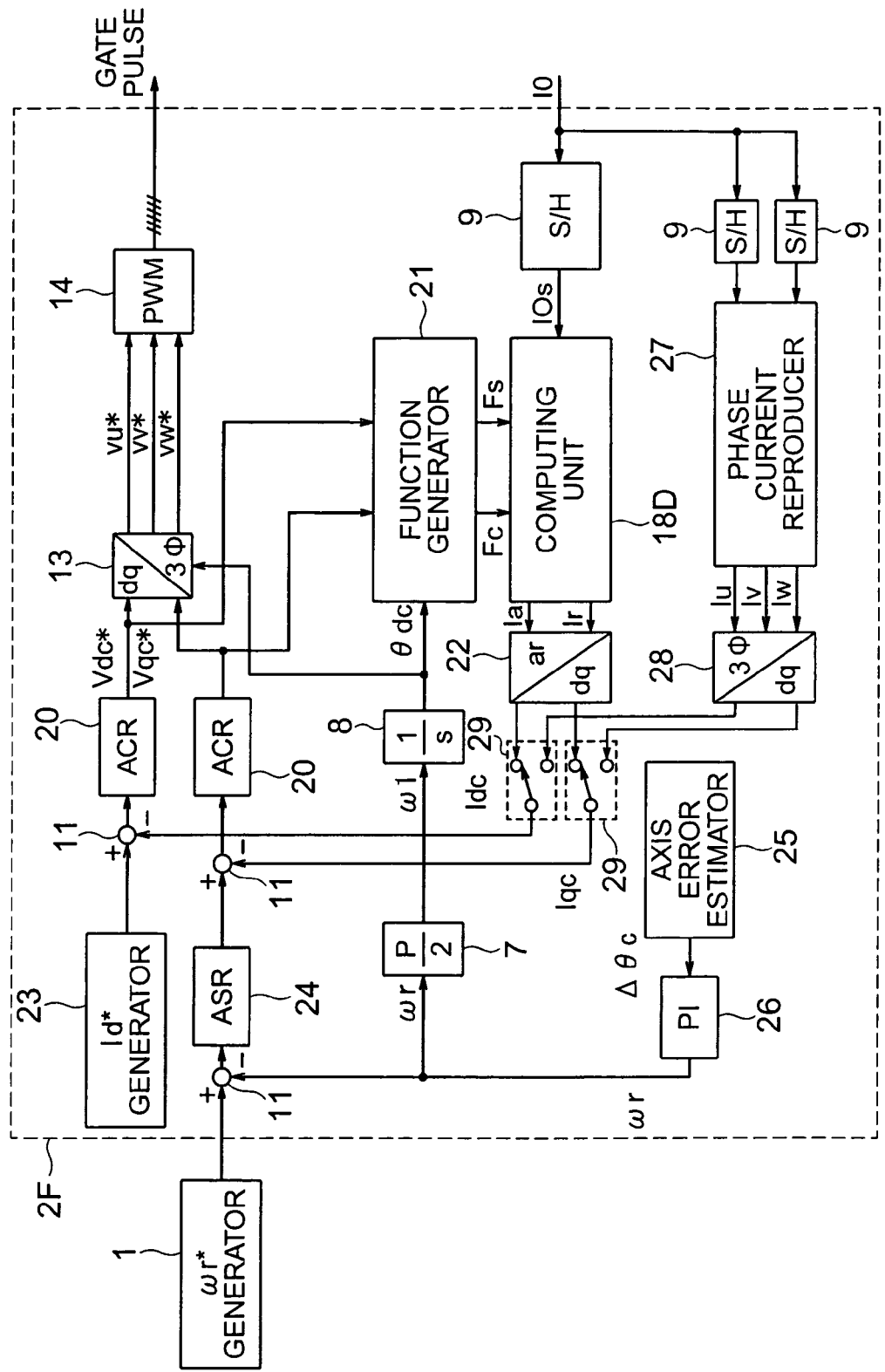
FIG. 16 is a block diagram showing a motor drive system according an additional embodiment of the present invention.

Referring to FIG. 16, a sixth embodiment of the present invention will be described.

The sixth embodiment provides a motor drive system capable of high-speed response in middle-speed and high-speed applications.

FIG. 16 is a block diagram of a controller 2F. In FIG. 16, two current samplers 9 are added to carry out sampling in every half period of a triangular carrier wave, and a phase-current reproducer 27 reproduces three-phase currents of the motor. This method for reproducing three-phases may be the prior art described in JP-A-2-197295. The three-phase currents are sent to the dq converter and their coordinates are converted and a switch 29 switches over the values to pass Idc and Iqc.

When a motor is driven by using an inverter, the faster the speed and the higher the carrier frequency, the pulse signal of the inverter becomes narrower, making it harder for the phase-current reproducer 27 to operate. However, under this condition, the two switches 29 are switched to the upper side to pass computed current values Ia and Ir. Conversely, when the pulse width is sufficiently large, the motor current is detected by using the current reproducer 27 to realize high-response current control.

As has been described, according to the sixth embodiment, by switching over the current detecting method, a high-performance motor drive system can be realized.

(Embodiment 7)

Figure 17:
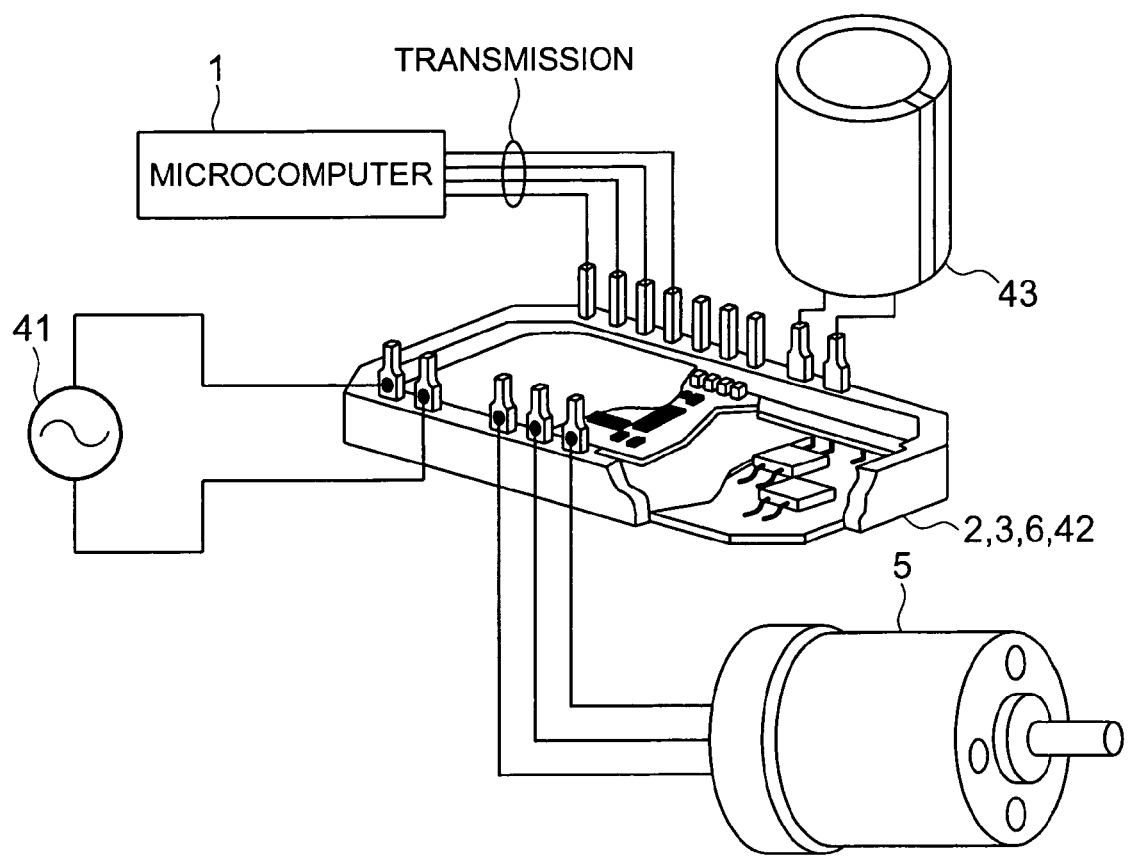
FIG. 17 is a schematic diagram of the motor drive system of the present invention.

FIG. 17 is a block diagram of a motor drive system for an AC motor according to the present invention. The parts of numbers 1~3, 5, 6, 41, 42, and 43 are the same as those of equal numbers in FIG. 1.

This sixth embodiment is characterized in that the controller 2, the inverter 3, the current detector 6, and a diode bridge 42 are integrated in one module. This module is provided with terminals to receive a rotation number command signal from the rotation number command generator 1, input terminals of the power supply 41, connection terminals of the smoothing capacitor 43, and connection terminals of the AC motor 5. The other component parts contained in the module as follows: the microcomputer-based controller 2, the inverter 3 formed by switching devices, the current detector 6, the current detector 6 formed by a shunt resistor, and the diode bridge 42. Note that in this embodiment a microcomputer is used for the rotation number command generator 1.

According to the embodiments described above, it is possible to realize a high-performance motor drive system for an AC motor in position-sensorless current-sensorless control by using a less-expensive microcomputer; therefore, it is possible to produce a modularized motor drive system.

As a result, the power module can be handled as a single part, thus making it easy to assemble the motor drive system and downscale the system structure.

According to the present invention, it now possible to realize an AC motor drive system with high performance at high carrier frequencies in a simple control configuration without any position sensor for detecting the rotor position of the AC motor, nor any current sensor for outputting current.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A motor drive system for an AC motor comprising:
    an AC motor;
    an inverter for generating a drive signal to drive said AC motor by using a sinusoidal continuous current;
    a controller for controlling said inverter by generating a pulse-width-modulated signal; and
    a power supply for supplying electric power to said inverter; and a current-detecting means for detecting an inverter current supplied to said inverter from the said power supply;
    wherein a sampling means is provided for sampling said inverter current detected by said current-detecting means in said inverter current; and
    wherein said sampling means samples said inverter current in a time consisting of 33~67% of said power conduction time from a rise-up time of the inverter current.

2. A motor drive system for an AC motor according to claim 1, further comprising an averaging process means for averaging sampled values from said sampling means.

3. A method of controlling an AC motor by said motor drive system according to claim 2, wherein said averaging process uses a ⅙-period moving average of drive periods in said drive signal.

4. A method of controlling an AC motor by said motor drive system according to claim 1, comprising the steps of further providing said motor drive system with an arithmetic operation means for arithmetic operation of calculating at least one of an active current and a reactive current of said AC motor, and performing said arithmetic operation at every ⅙ period of said drive period in said drive signal by using sampled values output from said sampling means.

5. A motor drive system for an AC motor according to claim 1, further comprises a generator for generating a periodic function dependent on a frequency of said drive signal and an arithmetic operation means for calculating at least one of an active current and a reactive current of said AC motor, and wherein said arithmetic operation is performed by using said periodic function and sample values output from said sampling means.

6. A method for controlling an AC motor according to claim 4, comprising the steps of calculating an exciting current component on the basis of a magnetic flux axis of said AC motor and a torque current component orthogonal to said magnetic flux axis by using said active and reactive currents and controlling said AC motor by using at least said exciting current component and said torque current component.

7. A motor drive system for an AC motor according to claim 1, further comprises a plurality of said sampling means and a phase current reproducing means for reproducing phase currents of said AC motor by using said plurality of sampling means and sample values output from said plurality of sampling means.

8. A motor drive system for an AC motor according to claim 1, wherein said inverter, said controller and said current detecting means are modularized.

9. A method for controlling an AC motor by a motor drive system which comprises an AC motor; an inverter for generating a drive signal to drive said AC motor by using a sinusoidal continuous current; a controller for controlling said inverter by generating a pulse-width-modulated signal on the basis of a 3-phase command voltage of said AC motor and a carrier signal of said AC motor; a power supply for supplying electric power to said inverter; and a current-detecting means for detecting an inverter current supplied to said inverter from the said power supply, said method comprising the steps of:
    providing sampling means for sampling said inverter current;
    using an intermediate time between a positive peak value and a negative peak value of said carrier signal as a sampling trigger; and sampling said inverter current values by said sampling means in response to said trigger.

10. A method for controlling an AC motor by a motor drive system which comprises an AC motor; an inverter for generating a drive signal to drive said AC motor by using a sinusoidal continuous current; a controller for controlling said inverter by generating a pulse-width-modulated signal on the basis of a 3-phase command voltage of said AC motor and a carrier signal of said AC motor; a power supply for supplying electric power to said inverter; and a current-detecting means for detecting an inverter current supplied to said inverter from the said power supply, said method comprising the steps of:

sampling means for sampling said inverter current is provided;

comparing said 3-phase command voltage with positive or negative peak values of said carrier signal;

selecting positive peak values or negative peak values of said carrier signal on the basis of comparison results, using times of selected positive peak values or negative peak values as a trigger, and sampling said inverter current by said sampling means in response to said trigger.

11. A motor drive system for an AC motor comprising:
an AC motor;
an inverter for generating a drive signal to drive said AC motor by using a sinusoidal continuous current;
a controller for controlling said inverter by generating a pulse-width-modulated signal;
a power supply for supplying electric power to said inverter; and
a current-detecting means for detecting an inverter current supplied to said inverter from the said power supply;
wherein a sampling means is provided for sampling said inverter current detected by said current-detecting means in said inverter current; and
wherein said controller controls an electrical angular frequency of said AC motor based on said inverter current.

12. A motor drive system for an AC motor according to claim 11, wherein said AC motor is a permanent magnetic type synchronous motor.

13. A motor drive system for an AC motor according to claim 11, wherein said AC motor is an induction motor.

14. A motor drive system for an AC motor according to claim 11, wherein said AC motor is a reluctance motor.

15. A motor drive system for an AC motor according to claim 11, wherein said controller controls the electrical angular frequency of said AC motor based on said inverter current by compensating an electrical angular frequency command of said AC motor with a compensation value based upon said inverter current.

16. A motor drive system for an AC motor according to claim 15, wherein said controller includes a filter for filtering an output of said sampling means and a compensator for providing the compensation value which is added to the electrical angular frequency command of the AC motor on the basis of the output of the filter.

17. A motor drive system for an AC motor according to claim 11, wherein said controller controls the electrical angular frequency of said AC motor based on said inverter current to enable driving of said AC motor without utilization of a rotator position sensor of said AC motor.

* * * * *